E. A. STARE.
SPRING WHEEL.
APPLICATION FILED OCT. 18, 1909.
1,146,362. Patented July 13, 1915.
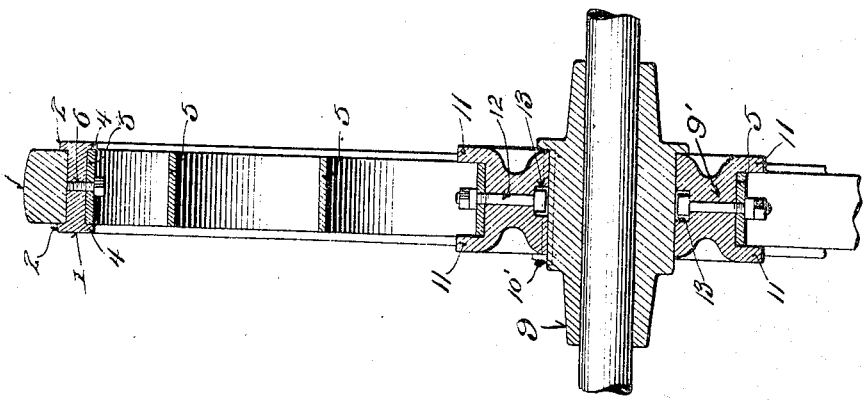
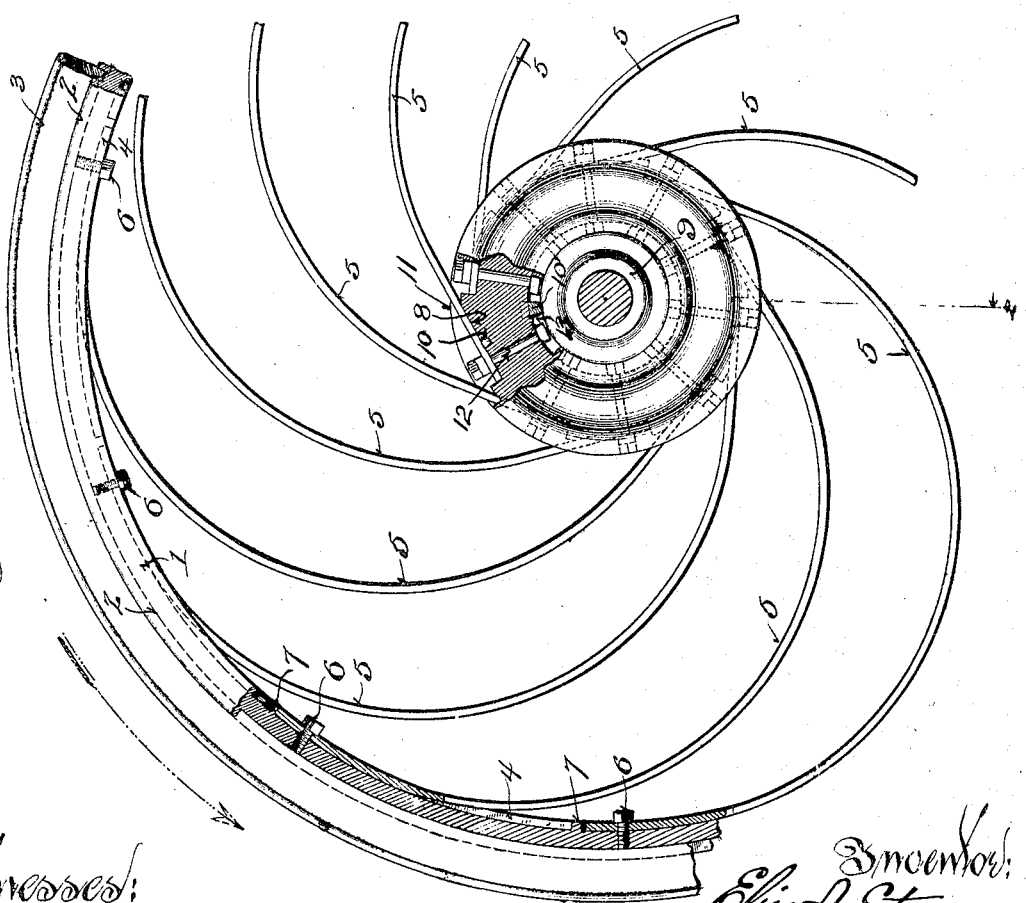

UNITED STATES PATENT OFFICE.

ELIAS A. STARE, OF WAUKESHA, WISCONSIN.

SPRING-WHEEL.

1,146,362. Specification of Letters Patent. Patented July 13, 1915.

Application filed October 18, 1909. Serial No. 523,114.

*To all whom it may concern:*

Be it known that I, ELIAS A. STARE, a citizen of the United States, and resident of Waukesha, in the county of Waukesha and State of Wisconsin, have invented certain new and useful Improvements in Spring-Wheels; and I do hereby declare that the following is a full, clear, and exact description thereof.

The object of this invention is to provide a simple, durable and effective spring-wheel, the construction and arrangement being such that the required resiliency is maintained as well as lateral rigidity, the spring-spokes being readily replaced when necessary.

The invention therefore consists in various details of construction and combination of parts to be fully set forth hereinafter with reference to the accompanying drawings and subsequently claimed.

In the drawings Figure 1 represents an elevation of a portion of a spring-wheel embodying the features of my invention, with parts broken away and parts in section for clearness in illustrating certain details, and Fig. 2, a transverse section of the wheel as indicated by line 2—2 in Fig. 1.

Referring by numerals to the drawings 1 indicates a metallic rim provided with peripheral flanges 2 that form a seat for a tread 3, which tread is preferably composed of rubber, leather or some analogous material. The inner face of the rim is also provided with flanges 4 whereby an annular countersunk face is formed, to which face are secured the ends of a series of semi-circular leaf springs 5, which constitute spoke-members. The outer ends of the springs are secured to the rim 1 by means of bolts 6, the spring ends being arranged to abut cross-ribs 7, which ribs connect the inwardly extended flanges 4. By this construction the strain upon the bolts 6 is relieved. The inner ends of the spring spokes are seated upon tangentially disposed faces 8 of a hub-ring 9' the spring ends being held in position upon said faces by means of integral teats, which teats engage recesses in the ring-faces 8. The hub-ring 9' is secured to a hub-sleeve 9 by means of a key 10' seated in the ring and hub-sleeve, the ring and hub-sleeve together constituting a hub. The ring portion 9' of the hub is provided with vertically disposed flanges 11, which flanges together with the tangential faces 8 form seats adapted to receive the inner ends of the spring-spokes 5. The inner ends of the spokes are secured to the faces 8 by means of bolts 12, which bolts pass through radial apertures in the hub-ring 9' and corresponding apertures in said spring-spokes. The heads of the bolts 12 are seated in an annular groove 13 formed within the inner face of the ring, the bolts and spring-spokes being secured by means of suitable lock-nuts which engage the outer ends of the latter and serve to draw the aforesaid ends of the spring-spokes securely upon the faces 8 of the ring, as shown. By this construction the ring and bolts are first assembled, being thereafter fitted upon the hub-sleeve 9 and keyed in the manner described and when the hub-members are thus assembled the spring-spokes may be readily connected and disconnected by manipulating the lock-nuts, whereby economy in the manufacture is obtained, while, at the same time, the retaining bolts are securely held and sealed, being thereby protected from mud and weather conditions. Furthermore, when the hub is completely assembled it produces a neat appearance not attainable when the spoke-retaining bolts are exposed. As shown the fastened ends of the semi-circular springs extend tangentially from both the hub and the rim. By this construction abrupt bends or curvatures in the springs at their secured ends is avoided and thereby the life of said springs is materially increased, due to elimination of the possibility of crystallization at these points. By connecting the end of the spring to be hub flange at the farthest point from the rim connection, it will also be observed that a full semi-circular spring can be utilized of maximum diameter whereby greater resiliency and life is added to the spring members.

In the section of spring-wheel shown, provision is made for applying a series of twelve spokes to the wheel, but this number may be reduced or increased in proportion to the load required to be sustained, and the torsional strength of the spokes may be also varied in proportion to the load by varying the thickness of said spokes.

The wheel as shown is designed to be forwardly rotated in the direction as indicated by the arrow, and thus when the vehicle is given a sudden start, there will be a limited winding action between the wheel rim and hub, which action would tend to slightly contract the spring spokes and thus relieve the vehicle of sudden jars incidental to starting from a dead stop, which jar is common to and unavoidable in cushion wheels of the pneumatic type. Punctures of the tread would have no effect upon the wheel as designed by me and should the said tread become worn, it can be readily and cheaply replaced, thus all of the essential features of a pneumatic tire are obtained by the construction as described, said construction being materially cheaper in comparison to wheels of the pneumatic type, both in the first cost of production and also in repairing. In the latter case a spoke can readily be detached by loosening the clip and bolt 11 without dismounting the wheel and a new spring-spoke substituted therefor.

I claim:

A wheel-hub comprising a hub-sleeve having a circular outer face provided with a projecting flange at one end, a circular spoke-receiving hub-member having a bore provided with an annular groove and which has groove-closing fit on said sleeve against the flange thereof, means by which the two hub elements aforesaid are detachably connected to rotate as one, tangential spoke-seating faces arranged about the outer surface of the sleeve-fitting hub-member and each provided with a seat for the engagement of a spoke-projection, said hub-member being provided with radial apertures between its groove and faces; and spoke-retaining bolts extending through said apertures, the heads of the bolts being angular and having anti-turning fit in the hub-member groove.

In testimony that I claim the foregoing I have hereunto set my hand.

ELIAS A. STARE.

Witnesses:
GEO. W. LOWRY,
MAY DOWNEY.